United States Patent [19]

Brown

[11] Patent Number: 5,053,283

[45] Date of Patent: Oct. 1, 1991

[54] THICK FILM INK COMPOSITION

[75] Inventor: Kenneth Brown, Alta Loma, Calif.

[73] Assignee: Spectrol Electronics Corporation, City of Industry, Calif.

[21] Appl. No.: 290,652

[22] Filed: Dec. 23, 1988

[51] Int. Cl.[5] ........................ B32B 15/04; B32B 17/06

[52] U.S. Cl. .................................. 428/432; 106/1.14; 106/1.24; 252/514; 252/518; 428/457; 428/901; 501/19

[58] Field of Search ............... 428/432, 457, 472, 901; 106/1.24, 1.14; 252/514, 518; 501/15, 19

[56] References Cited

U.S. PATENT DOCUMENTS

| | | | |
|---|---|---|---|
| Re. 31,437 | 11/1983 | Boonstra et al. | 428/432 X |
| 3,865,742 | 2/1975 | Greenstein | 252/514 |
| 3,963,505 | 6/1976 | Dumesnil et al. | 501/15 |
| 4,256,796 | 3/1981 | Hang et al. | 428/457 X |
| 4,312,770 | 1/1982 | Yu et al. | 106/1.14 |
| 4,362,656 | 12/1982 | Hormadaly | 252/518 |
| 4,379,195 | 4/1983 | Prabhu et al. | 428/472 X |
| 4,415,486 | 11/1983 | Boonstra et al. | 422/432 X |
| 4,452,844 | 6/1984 | Prabhu et al. | 428/432 X |
| 4,467,009 | 8/1984 | Prabhu et al. | 428/901 |
| 4,539,223 | 9/1985 | Hormadaly | 106/1.24 |
| 4,925,607 | 5/1990 | Kyle | 501/15 X |

*Primary Examiner*—Thomas J. Herbert

*Attorney, Agent, or Firm*—Woodard, Emhardt, Naughton, Moriarty & McNett

[57] ABSTRACT

An abrasion resistant low temperature air fired thick film ink composition is disclosed. The composition includes a glass matrix material having a softening point below about 700° C., a particulate conductive material and a particulate reinforcing material.

2 Claims, No Drawings

THICK FILM INK COMPOSITION

TECHNICAL FIELD

The present invention is directed to thick film inks for use in variable resister type devices.

BACKGROUND ART

Conventional ink formulations used in the construction of multilayer circuit structures are typically applied to ceramic substrates and are processed at high temperatures, e.g. 800° C. to 1200° C. Composite substrates have been developed which permit the fabrication of higher power circuits. These composite substrates are typically combinations of metal cores with insulating glass or glass ceramic coatings, e.g. enameled steel or flame sprayed alumina on aluminum. The coatings on such composite substrates tend to delaminate due to differential thermal expansion if the substrates are subjected to the elevated temperatures required for firing conventional resistor inks.

While low firing temperature, i.e. less than 800° C. resistor inks are known, each is deficient in some respect. Air fired low temperature inks typically exhibit poor stability and abrasion resistance, while inert fired low temperature inks may provide acceptable properties but require very costly processing.

What is needed in the art is a low temperature air fired thick film ink for use in the construction of laminar circuit structures on composite substrates.

DISCLOSURE OF INVENTION

A thick film ink composition is disclosed. The composition comprises a thick film ink composition, comprising: from about 10 weight % to about 70 weight % of a glass matrix material having a softening point below about 700° C., up to about 90 weight % of a particulate conductive material, and from about 2 weight % to about 40 weight % of a particulate reinforcement wherein the particulate reinforcement comprises a spinel.

An electronic assembly is also disclosed. The assembly comprises a layer of thick film ink composition of the present invention disposed on a ceramic coated metal substrate.

BEST MODE FOR CARRYING OUT THE INVENTION

The glass matrix of the composition of the present invention may comprise any glass having a softening temperature between 350° C. about 700° C. Borosilicate glasses, such as zinc, cadmium or lead borosilicate, and mixtures of borosilicate glasses are suitable. Lead borosilicate glasses are preferred. A glass known as SG67, available from PPG Corporation, has been found to be particularly suitable for use in the present invention as it offers excellent adhesion to flame sprayed alumina coatings. The SG67 glass exhibits a density of 5.38 g/cm$^3$, an annealing point of about 365° C., a softening point of about 441° C. and a coefficient of thermal expansion of $83\times10^{-7}$/°C. A second lead borosilicate glass known as 2143, available from Drakenfield Colors of Washington, Pa. is also suitable. The 2143 glass has a softening point of about 375° C. and a coefficient of thermal expansion of about $105\times10^{-7}$/°C.

The conductive component of the composition of the present invention may comprise a particulate corrosion resistant metal or a particulate support coated with a corrosion resistant metal wherein the particles are between about 0.1 micron and about 50 microns in size. Conventional conductive powders used in conductive thick film inks are suitable. It is preferred that the corrosion resistant metal comprise a noble metal such as ruthenium, palladium, silver, platinum, gold or rhodium. Noble metal oxides or other noble metal compounds may also be used. Mixtures of particulate metals, mixtures of metal coated particles and mixtures of particulate metal and metal coated particles are also suitable. It is preferred that the conductive component comprise particles between about 0.5 microns and about 10 microns in size. A coprecipitated mixture of Pd and Ag is particularly preferred. A coprecipitated mixture of Pd and Ag known as A-4072 available from Englehard Minerals & Chemical Corp. is preferred. A-4072 comprises 25 weight % Pd and 75 weight % Ag and exhibits an average particle size of 1.8 um, a surface area of 7–11 m$^2$/g, and a tap density of 1.15 gm/cm$^3$.

The reinforcing particles of the composition of the present invention may comprise particles of any crystalline inorganic material having a Mohs hardness of about 7.5 or greater and a melting temperature above about 1500° C. Inorganic compounds having a "spinel" face centered cubic structure, typically exhibit the requisite mechanical, chemical and thermal stability. Spinels are conventionally used as opacifiers, pigments and stains in ceramic glaze compositions. The spinel structure is exhibited by binary compounds of the general formula $RO.R'_2O_3$ wherein R may be Mg, Zn, Ni, Co, Cd, Mn or Fe and R' may be Cr, Al or Fe, as well as a host of analogous multicomponent compounds such as $RO.R''O.R_2'''O_3$ wherein R may be Mg, Zn, Ni, Co, Cd, Mn, Fe or Zr, R'' may be Mg, Zn, Ni, Co, Cd, Mn, Fe and R''' may be Cr, Al or Fe. Other hard, high melting compounds such as lead zirconium titanates are also suitable as reinforcing particles. A ceramic composition known commercially as "zirconium spinel" has been found to be particularly suitable for use in the present invention. Zirconium spinel is a synthetic complex containing from about 39 weight % to about 41 weight % zirconium oxide, from about 20 weight % to about 22 weight % silicon dioxide, from about 18.5 weight % to about 20.5 weight % aluminum oxide, and from about 17 weight % to about 21 weight % zinc oxide. The complex has a melting point of about 1700° C. and is conventionally used as a glaze opacifier in the ceramic industry. A zirconium spinel known as TAM 51426 Double Silicate manufactured by TAM Ceramics, Inc., Niagra Falls, N.Y. has been found to be particularly suitable for use in the present invention. TAM 51426 Double Silicate has a specific gravity of 4.7, a Fisher number of 1.9 microns and contains about 99.02% -325 mesh particles. TAM 51426 Double Silicate comprises 17.7 weight % zinc oxide, 19.2% weight % aluminum oxide, 40.4 weight % zirconium oxide and 21.7 weight % silicon dioxide.

The composition of the present invention comprises from about 10 to about 70% by weight of the glass matrix material, up to about 90% by weight of the conductive material, and from about 2 to about 40% by weight reinforcing particles. By selecting the relative amount of conductive material in the composition of the present invention, dielectric inks, resistor inks and conductive inks may be formulated.

A dielectric ink may be formulated by omitting the conductive material. A dielectric ink of the present invention comprises from about 10 weight % to about 90 weight % of a glass matrix material and from about 10 weight % to about 90 weight % reinforcing particles. Dielectric inks of the present invention provides an extremely hard, durable insulating glaze with a dielectric constant between about 8.0 and about 30.0, an insulation resistivity of greater than about $10^9$ ohm-cm and a dissipation factor of less than about 0.5%.

An abrasion resistant resistor ink of the present invention comprises from about 10 weight % to about 70 weight % of a glass matrix material, from about 15 weight % to about 20 weight % of a particulate reinforcement and greater than about 5 weight % of a particulate conductive material, in an amount effective to provide a resistor ink composition having a resistance of greater than 0.5 ohms/square.

An abrasion resistant conductor ink of the present invention comprises from about 10 weight % to about 70 weight % of glass matrix material, from about 3 weight % to about 7 weight % of a particulate reinforcing material and up to about 90 weight % of a particulate conductive material, in an amount effective to provide an ink composition having a resistance of up to 0.5 ohms/square.

The choice of a particular glass matrix material, a particular conductive material and a particular reinforcing material and the relative proportions in which they may be combined are based on the demands of the particular application. For example, a particular ink is formulated so that the coefficient of thermal expansion of the ink is close enough to the coefficient of the thermal expansion of the particular substrate within the temperature range of interest so that differential thermal expansion of the ink relative to the substrate does not result in delamination of the ink from the substrate.

The composition is mixed with an effective amount of a vehicle for application to the substrate. Suitable vehicle are known in the art and include, for example, decanol, terpeniol or butyl carbutol acetate solutions of resins such as ethyl cellulose. The mixture may be applied to the substrate by conventional means such as silk screening, brushing or spraying. Once the coating has been applied, the coated substrate is air dried to evaporate the solvent and is then fired at a temperature between about 500° and about 650° C. in air to fuse the coating.

EXAMPLE

The compositions set forth in Table I were formulated, mixed with vehicle, and applied by silk screen to form a 0.0005 inch to 0.0025 inch thick layer on alumina coated aluminum substrates. The coated substrates were air dried for 10+5 minutes and then fired in air at 600° C. for 10 minutes. The resistance, TCR and abrasion resistance of each composition was determined. Results are given in Table II.

TABLE I

| Composition | A | B | C | D | E | F |
|---|---|---|---|---|---|---|
| Glass | | | | | | |
| SG67 | 10 g | 10 g | — | — | — | — |
| 2143 | — | — | 65 g | 65 g | 25 g | 25 g |
| Conductor | | | | | | |
| Pd/Ag | 90 g | 90 g | 5 g | 10 g | 40 g | 40 g |
| Pd | — | — | — | — | 40 g | 40 g |
| Reinforcement | | | | | | |
| 51426 | — | 5 g | 30 g | 30 g | — | 20 g |

TABLE II

| Composition | Resistance (ohms/square) | TRC ($10^{-6}$/°C.) | Abrasion Resistance |
|---|---|---|---|
| A | 0.095 | — | Poor |
| B | 0.100 | — | Excellent |
| C | 15 | +400 | Excellent |
| D | 9 | +360 | Excellent |
| E | 20 | +320 | Poor |
| F | 25 | +180 | Excellent |

Poor abrasion defined as failure of potentiometer element/contact assembly after less than 1,000 rotational cycles. Excellent is no failure before 1,000,000 cycles. Compositions A and E exhibited poor abrasion resistance, while compositions B, C, D and F exhibited excellent abrasion resistance.

Although this invention has been shown and described with respect to detailed embodiments thereof, it will be understood by those skilled in the art that various changes in form and detail thereof may be made without departing from the spirit and scope of the claimed invention.

I claim:

1. An electronic assembly, comprising a metallic substrate comprising aluminum a layer of ceramic coating substantially covering at least one surface of the substrate, said ceramic coating comprising a layer of flame-sprayed alumina, a layer of a thick film ink composition disposed upon the layer of ceramic coating, wherein the thick film ink composition comprising from about 10 weight % to about 70 weight % of a glass matrix material comprising a borosilicate glass having a softening point below about 700° C., up to about 90 weight % of a particulate conductive material comprising a member of the group palladium particles and silver particles, and from about 2 weight % to about 40 weight % of a particulate reinforcement material comprising a zirconium spinel.

2. A thick film composition comprising from about 10 weight % to about 70 weight % of a glass matrix material comprising a lead borosilicate glass having a softening point below about 700° C., up to about 90 weight % of a particulate conductive material comprising a member of the group palladium particles and silver particles, and from about 2 weight % to about 40 weight % of a particulate reinforcing material comprising a zirconium spinel.

* * * * *